(12) United States Patent
Gretz

(10) Patent No.: US 6,956,171 B1
(45) Date of Patent: Oct. 18, 2005

(54) RECESSED OUTLET BOX WITH FLANGES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 72 days.

(21) Appl. No.: 10/863,942

(22) Filed: Jun. 9, 2004

(51) Int. Cl.[7] .............................................. H01H 9/02
(52) U.S. Cl. ........................... 174/58; 174/58; 174/57; 174/63; 174/50; 248/906; 439/535
(58) Field of Search .............................. 174/57, 58, 63, 174/50; 220/3.5, 3.7, 4.02, 3.3, 3.9; 439/535; 248/906

(56) References Cited

U.S. PATENT DOCUMENTS

| | | | |
|---|---|---|---|
| 4,059,327 A | 11/1977 | Vann | |
| 4,634,015 A | 1/1987 | Taylor | |
| 4,936,794 A | 6/1990 | Shaw et al. | |
| 4,988,832 A | 1/1991 | Shotey | |
| 5,117,996 A * | 6/1992 | McShane | 220/3.7 |
| 5,549,266 A | 8/1996 | Mitchell et al. | |
| 5,596,174 A * | 1/1997 | Sapienza | 174/57 |
| 5,600,093 A * | 2/1997 | Herth et al. | 174/53 |
| 5,603,424 A * | 2/1997 | Bordwell et al. | 220/3.5 |
| 6,414,241 B1 * | 7/2002 | O'Donnell | 174/57 |
| 6,429,371 B2 * | 8/2002 | Schiedegger et al. | 174/50 |
| 6,576,835 B1 * | 6/2003 | Ford et al. | 174/50 |
| 6,586,679 B2 * | 7/2003 | Bashford | 174/58 |
| 6,727,428 B2 * | 4/2004 | Archer et al. | 174/50 |
| 6,737,576 B1 | 5/2004 | Dinh | |
| 6,753,471 B2 * | 6/2004 | Johnson et al. | 174/50 |
| 6,818,823 B2 * | 11/2004 | Barnes | 174/50 |

OTHER PUBLICATIONS

CA 644,330 Issued Jul. 10, 1962.

* cited by examiner

Primary Examiner—Dhiru R. Patel

(57) ABSTRACT

A recessed electrical box having one or more flanges making it easily adaptable to installation on either a finished or unfinished exterior wall of a building. A preferred embodiment includes an inner and outer flange with the inner flange being easily removable. For installation on an unfinished wall, a hole is made in the exterior substrate and the box inserted until the inner flange is flush with the substrate. Fasteners are driven through holes provided in the inner flange to secure the box to the substrate. Lapped siding or any appropriate siding material, is then installed within the gap and placed flush with the sides of the box. For installation on a finished wall, the inner flange is removed and a hole is made in the exterior substrate and the siding and the box inserted until the outer flange is flush with the siding. Holes are drilled in the outer flange and fasteners inserted therein to secure the recessed electrical box to the siding and substrate. A second embodiment simplifies installation of a recessed electrical box in a retrofit situation on a finished wall and a third embodiment simplifies installation of a recessed electrical box on a substrate that will be finished with stucco.

19 Claims, 14 Drawing Sheets

RECESSED OUTLET BOX WITH FLANGES

FIELD OF THE INVENTION

This invention relates to electrical junction boxes and specifically to a recessed outlet box that can be easily secured to the exterior of a building for accommodating and protecting a duplex outlet or other electrical device therein.

BACKGROUND OF THE INVENTION

In the mounting of duplex outlets, switches, and other electrical devices to the exterior of a building, two common practices are usually followed.

A first practice, usually followed on an unfinished exterior wall, involves mounting an electrical junction box within the wall. The electrical box is nailed or otherwise fastened to a wall stud with the junction box opening positioned to be roughly flush with the finished wall surface. An electrical box installed in this manner is usually termed a "recessed" box as it is recessed behind the outer wall of the building structure.

A second practice involves installing a "flush-mount" electrical box. This involves an electrical box that is nailed either directly to the outer surface of a building or to the substrate just below the outer surface. In either of these cases, as compared to the recessed electrical box, the flush-mount electrical box does not provide as much protection to the electrical box. In the flush-mount electrical box, at least a portion of the electrical box extends beyond the outer surface of the building, thereby making it prone to impact damage. A flush-mount electrical box mounted near the foundation, could, for example, be susceptible to damage caused by impacts from lawn mowers, vehicles, or other hazards.

Of the two common methods for installing electrical boxes on the exterior of buildings, the recessed box is by far the best method for providing an electrical box that is secure and less likely to be damaged by impacts. By recessing the electrical box in the wall, it is well protected against potential damaging impacts.

Although it is a simple practice to install exterior electrical boxes on an unfinished building in which wall studs are exposed, it is not quite as straightforward to install an electrical box on a finished wall. In this situation, usually termed a "retrofit", an electrical box must be installed on a finished building. In this case, the mounting brackets on a typical electrical junction box are inadequate. The finished surface on the building, such as lapped siding, must be removed to expose the underlying substrate or sheathing to which the electrical box can be secured.

What is needed therefore is a recessed electrical box that is adaptable to being installed easily on a finished or an unfinished building.

SUMMARY OF THE INVENTION

The invention is a recessed electrical box with flanges, including a removable inner flange, a permanent outer flange, and a gap having an axial wall therebetween. The electrical box can be installed on an exterior wall, including either a finished or an unfinished wall. For installation on an unfinished wall, a hole is made in the substrate and the recessed box is inserted until the inner flange contacts the substrate. To secure the electrical box to the building, fasteners are driven through holes provided in the inner flange and into the substrate. The finishing layer, consisting of lapped siding or any appropriate siding material, is installed within the gap and placed snug against the axial wall.

For installation on a finished wall, the inner flange is removed and a hole cut in the siding or other finish layer to a size large enough to accommodate the outer periphery of the axial wall. The electrical box, with the inner flange removed, is fitted into the hole and pushed therein until the outer flange is flush with the outer surface of the finish layer. Holes are drilled in the outer flange and fasteners inserted therein to secure the recessed electrical box to the finish layer and thereby to the building. Caulking is applied as necessary around the perimeter of the electrical box at its juncture with the finish layer to seal against rain and moisture.

As described above, the electrical box of the present invention can provide a recessed electrical box on either a finished or an unfinished wall.

OBJECTS AND ADVANTAGES

One advantage of the recessed electrical box of the present invention is that it simplifies the installation of electrical devices on all types of finished exteriors, including siding or stucco. The siding can be flat or lapped and be constructed of vinyl, aluminum, or wood.

Another advantage provided by the electrical box of the present invention is that it is adaptable to being installed on an unfinished wall or as a retrofit on an existing finished wall.

A further advantage is that the recessed electrical box provides a first enclosure that positions the electrical device within the exterior wall, thereby shielding the electrical device from impacts, and a second enclosure for shielding the electrical device from rain and other environmental elements.

Another advantage is that the recessed electrical box of the present invention provides a breakaway inner flange, which can be retained for mounting on unfinished walls or broken off in a retrofit situation.

A further advantage is that a wide front flange is provided for covering mistakes or to cover a poorly cut mounting hole for a retrofit application.

The current recessed electrical box further provides, when used to house a duplex outlet, an electrical box and a spacious protective enclosure for protecting the plug ends of electrical cords.

A further advantage is that the electrical box, and inner and outer flanges are molded integrally in one piece, thereby reducing production costs.

The electrical box furthermore includes integral bosses with threaded bores for accepting fasteners from an electrical device.

The electrical box of the present invention also includes a pivotable cover for closing the protective enclosure, which provides the advantage of being able to move the cover between an open and closed position.

The electrical box of the present invention provides an electrical junction box that is UL-listed to meet the requirements of the electrical code. It has the advantage of working on all siding types and can be installed before or after the siding is installed.

These and other objects and advantages of the present invention will be better understood by reading the following description along with reference to the drawings.

TABLE OF NOMENCLATURE

Figure 1:
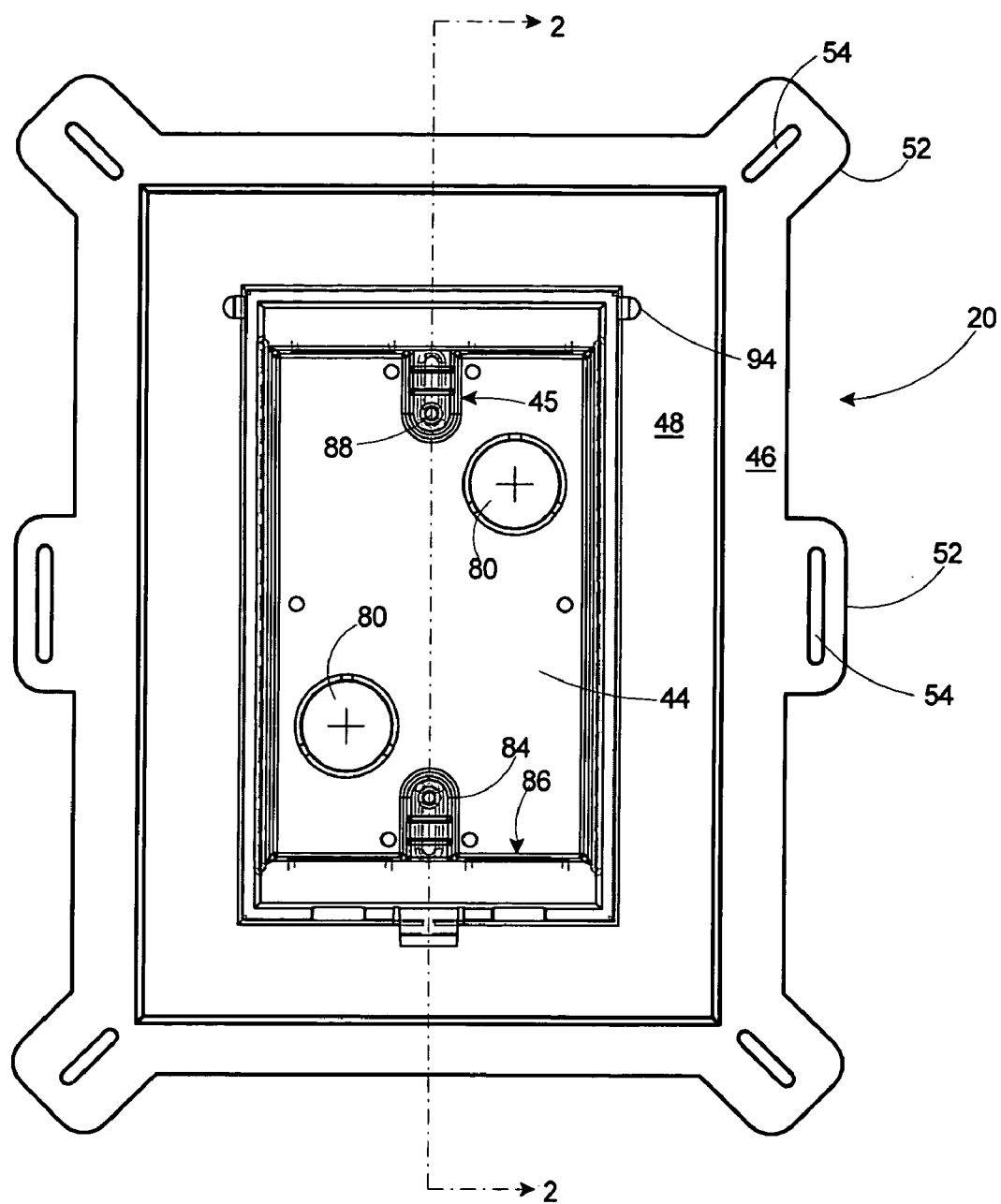
FIG. 1 is a front view of a first and preferred embodiment of a recessed electrical box according to the present invention.

The following is a listing of part numbers used in the drawings along with a brief description:

| Part Number | Description |
| --- | --- |
| 20 | recessed electrical box, preferred embodiment |
| 22 | first box |
| 24 | back wall of first box |
| 26 | peripheral sidewalls of first box |
| 28 | open front of first box |
| 30 | first enclosure |
| 32 | front edge of first box |
| 34 | transverse wall portion |
| 36 | second peripheral sidewalls or axial wall |
| 38 | second box |
| 40 | second enclosure |
| 42 | planar front edge of second box |
| 44 | opening of second box |
| 45 | securement arrangement |
| 46 | inner flange |
| 48 | outer flange |
| 50 | outer edge |
| 52 | ear |
| 54 | slot |
| 56 | back surface of inner flange |
| 58 | groove |
| 60 | first side of inner flange |
| 62 | second side of inner flange |
| 64 | third side of inner flange |
| 66 | fourth side of inner flange |
| 68 | outer periphery of second box |
| 70 | outer periphery of first box |
| 72 | plane of inner flange |

-continued

| Part Number | Description |
| --- | --- |
| 74 | plane of outer flange |
| 76 | indentation in outer flange |
| 78 | front surface of outer flange |
| 80 | removable wall portion |
| 81 | cord slots |
| 84 | integral projections |
| 86 | inner surface of peripheral sidewalls |
| 88 | threaded bore |
| 90 | cover member |
| 92 | apertures in cover member |
| 94 | post |
| 96 | gap |
| 100 | recessed electrical box, second embodiment |
| 102 | hole in substrate, siding, or both |
| 104 | siding |
| 106 | substrate |
| 110 | recessed electrical box, third embodiment |
| 112 | stucco finish layer |
| 114 | holes in inner flange |
| 118 | fastener |
| 120 | drilled hole in outer flange |
| 122 | back surface of outer flange |
| 124 | hole in outer flange |
| 126 | duplex outlet |
| 128 | device fasteners |
| 130 | face plate |
| 132 | terminal of duplex outlet |
| 134 | plug end |
| 136 | electrical cord |
| 138 | caulking |

DETAILED DESCRIPTION OF THE INVENTION

The present invention comprises a recessed electrical box for securing an electrical device on the exterior wall of a building. The recessed electrical box has features that allow it to be easily installed on either a new building or on an existing building. It can be installed on a new building having unfinished walls, in which the finishing surface, such as siding or stucco, will be installed later, or as a retrofit on an existing building.

With reference to FIGS. 1–4, a first and preferred embodiment of a recessed electrical box 20 according to the present invention is shown. The recessed electrical box includes a first box 22 having a back wall 24, orthogonally extending peripheral sidewalls 26, and an open front 28 defining a first enclosure 30 therein. The peripheral sidewalls 26 of the first box 22 include a front edge 32 at the open front 28. A transverse wall portion 34 extends outwardly and orthogonally from the peripheral sidewalls 26 at the front edge 32. Second peripheral sidewalls 36 extend orthogonally from the transverse wall portion 34 and form a second box 38 and a second enclosure 40 therein. The second peripheral sidewalls 36 terminate in a planar front edge 42. The planar front edge 42 includes an opening 44 therein leading into the second enclosure 40. A securement arrangement 45 at the open front 28 of the first enclosure 30 is capable of accepting an electrical device (not shown) therein.

Figure 2A:
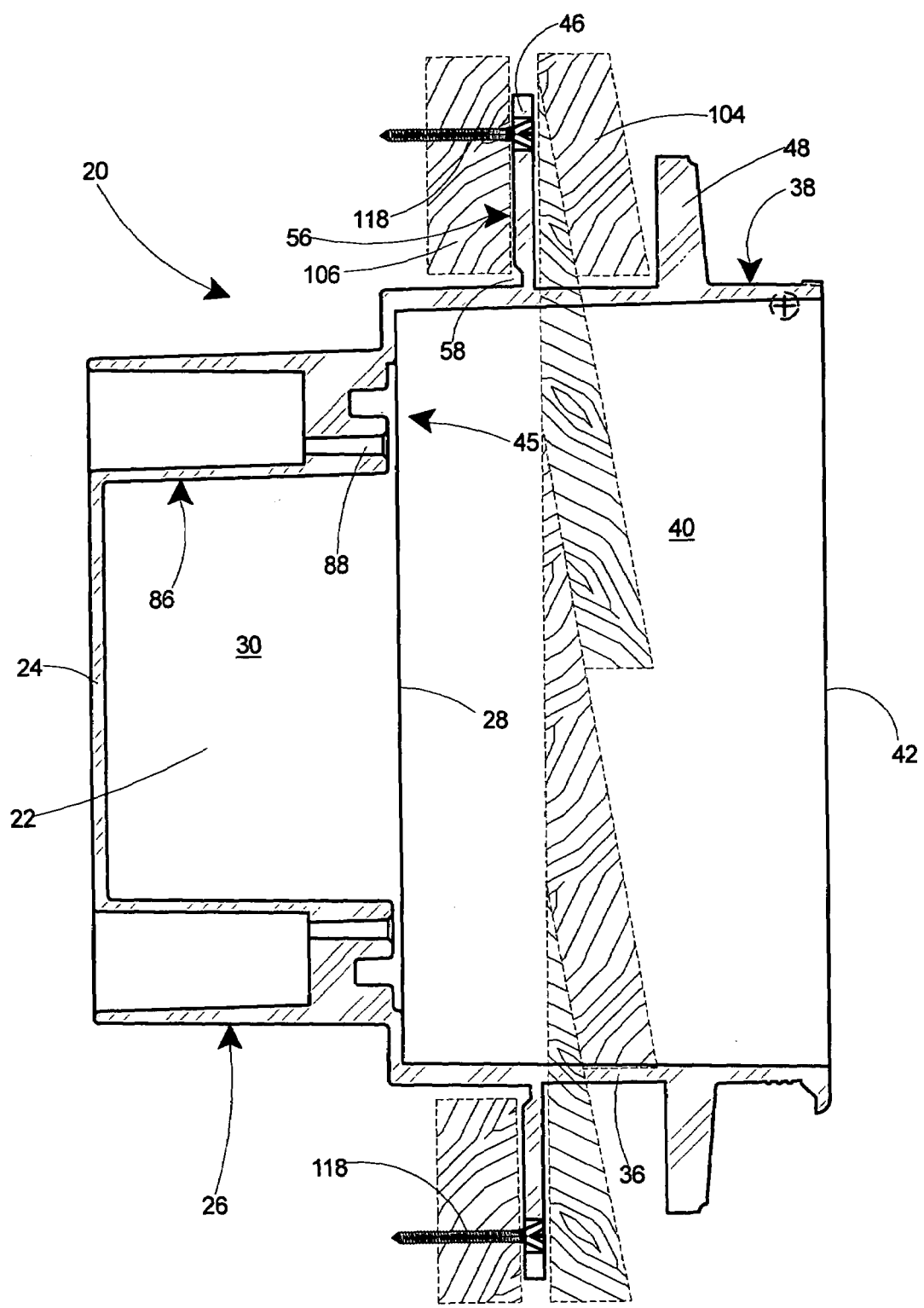
FIG. 2A is a sectional view of the recessed electrical box taken along line 2—2 of FIG. 1 and shown mounted to the substrate of a newly constructed building.
Figure 4:
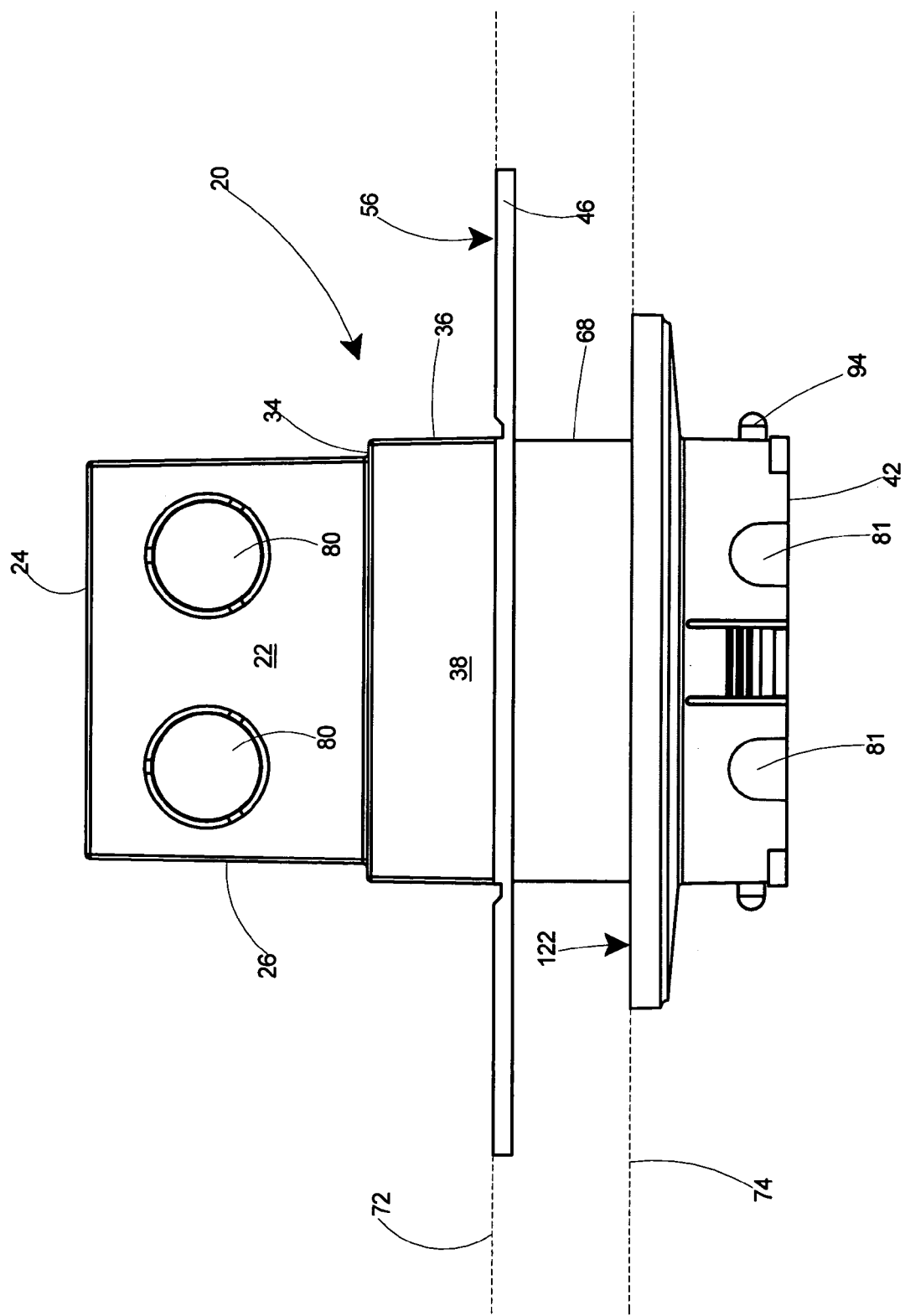
FIG. 4 is a bottom view of the electrical box of FIG. 1.
Figure 5:
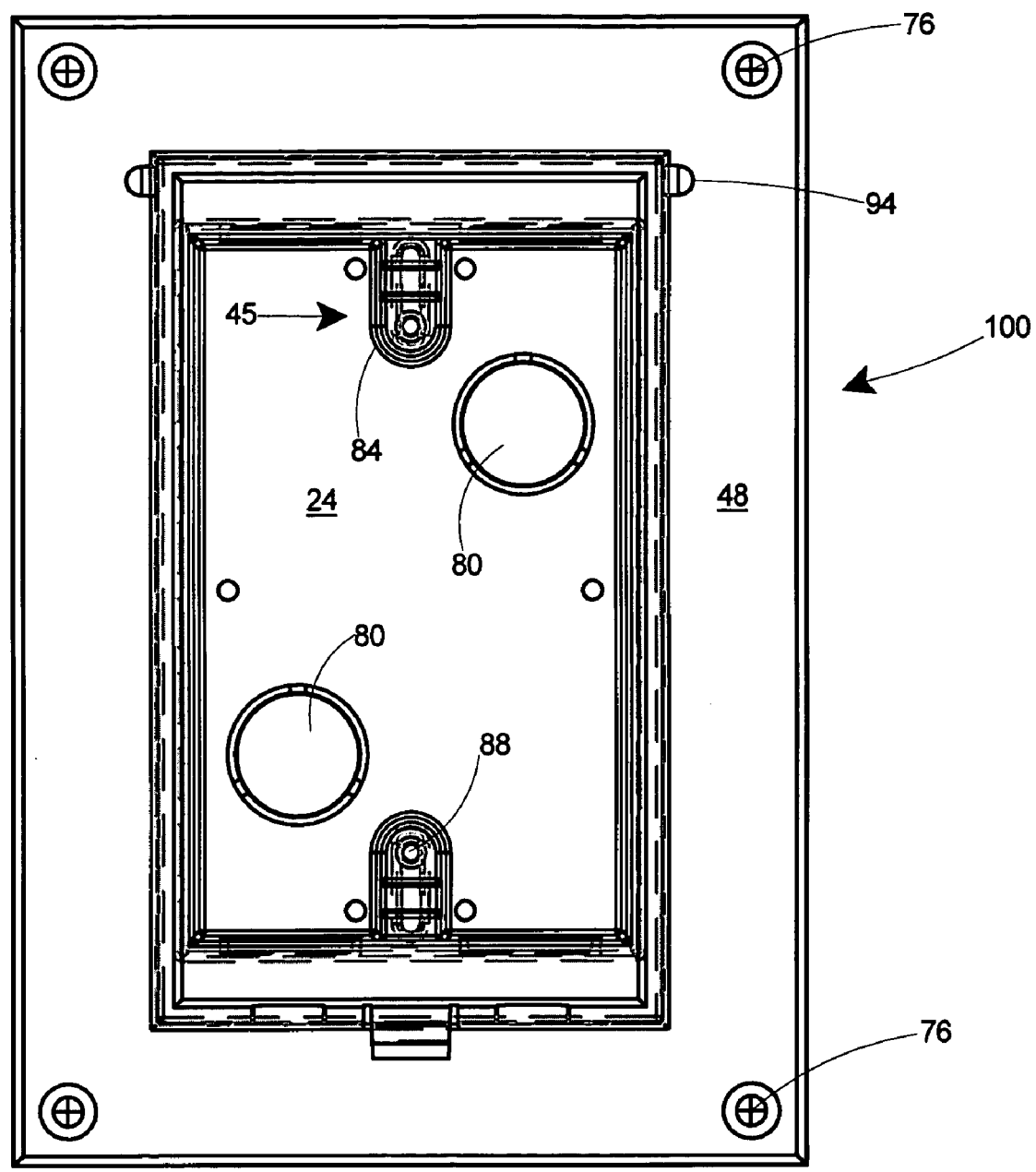
FIG. 5 is a front view of a second embodiment of a recessed electrical box according to the present invention.

The recessed electrical box of the present invention includes at least one flange integral with and extending outwardly and orthogonally from the second peripheral sidewalls. For the preferred embodiment, as shown in FIGS. 2A and 4, the recessed electrical box 20 includes an inner flange 46 and an outer flange 48. As shown in FIGS. 1 and 4, the inner flange 46 extends transversely substantially beyond the outer flange 48. The outer flange 48 extends transversely substantially beyond the second peripheral sidewalls 36. The inner flange 46 includes an outer edge 50 and a plurality of ears 52 extending beyond the outer edge 50. A slot 54 is included in each of the ears 52 of the inner flange 46.

Figure 3:
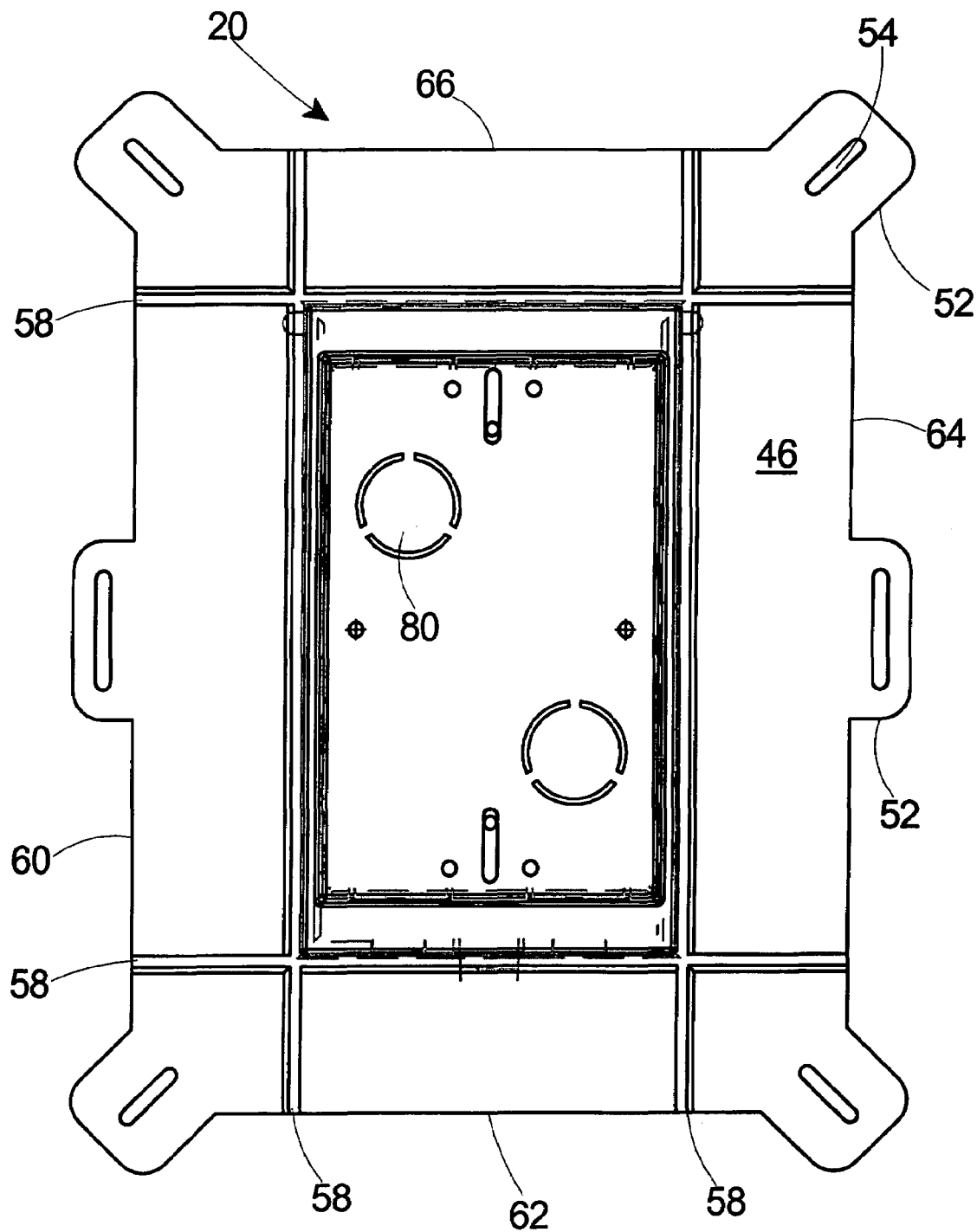
FIG. 3 is back view of the electrical box of FIG. 1.

Referring to FIGS. 2A and 3, the back surface 56 of the inner flange 46 includes grooves 58 adjacent each of the second peripheral sidewalls 36. The grooves 58 extend from one side 60, 62 of the outer edge 50 to the corresponding opposing side 64, 66 of the outer edge 50. The grooves 58 form reduced thickness flange portions to allow scoring therein to remove the inner flange 46 adjacent the second peripheral sidewalls 36.

With reference to FIG. 4, the second box 38 has an outer periphery 68 that, as a result of the outwardly extending transverse wall portion 34, is larger than the outer periphery 70 of the first box 22. The inner 46 and outer 48 flanges are in parallel planes 72, 74. Removal of the inner flange 46 creates an outer surface substantially equal to the outer periphery 68 of the second box 38 or, in other words, scoring along the grooves 58 adjacent the outer periphery 68 and subsequently breaking off the inner flange 46 creates a smooth outer periphery with the inner flange 46 completely removed therefrom. The outer flange 48, as shown in FIG. 4, extends substantially beyond the second peripheral sidewalls 36.

Referring to FIGS. 1 and 4, the back wall 24 and the peripheral sidewalls 26 of the first box 22 include one or more removable wall portions 80 or knockouts, which may be removed to provide a passage for wiring into the first box 22. The second peripheral sidewalls 36 of the second box 38 also include one or more cord slots 81 extending therein from the front edge 42 at the opening 44. The cord slots 81 thereby forming a passageway for electrical cords.

With reference to FIGS. 1 and 2A, the recessed electrical box further includes a securement arrangement 45. The securement arrangement 45 includes integral projections 84 from the inner surface 86 of the peripheral sidewalls 26 that extend transversely into the first enclosure 30. The integral projections 84 include threaded bores 88 therein.

The recessed electrical box can further include a cover member, such as the cover member 90 having apertures 92 therein as shown in FIGS. 11–14. Typically the recessed electrical box 20 is provided with posts 94 at the planar front edge 42 of the second box 38, such as shown in FIG. 4, upon which the cover member (not shown) can be pivotably attached thereto to cover the outer opening 44 of the recessed electrical box 20. The inner 46 and outer 48 flanges of the recessed electrical box 20 reside in parallel planes 72, 74 and form a gap 96 therebetween. The width of the gap 96 is approximately 0.937 inch to allow it to accept siding of most standard thicknesses.

Figure 8:
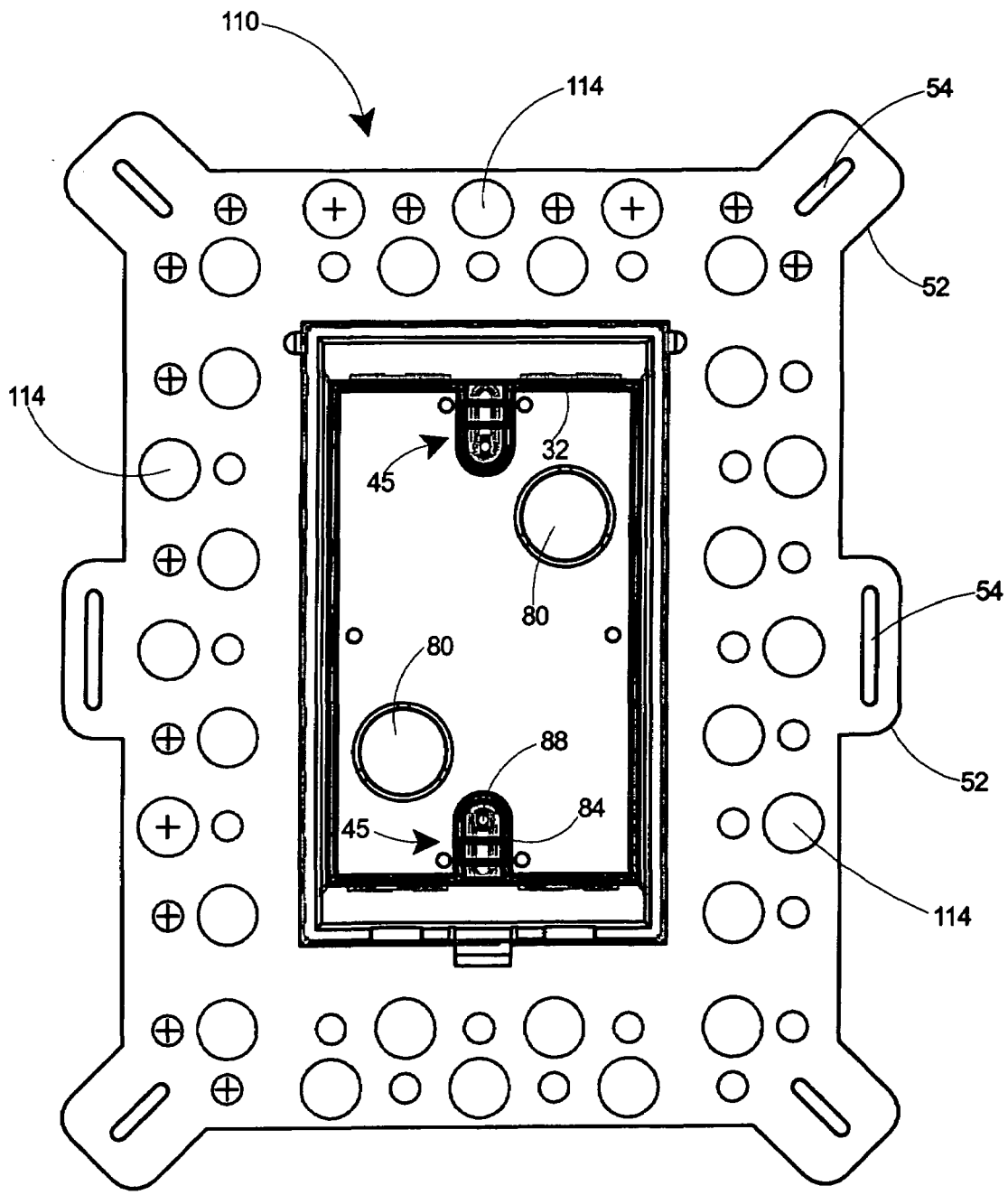
FIG. 8 is a front view of a third embodiment of a recessed electrical box according to the present invention.
Figure 9:
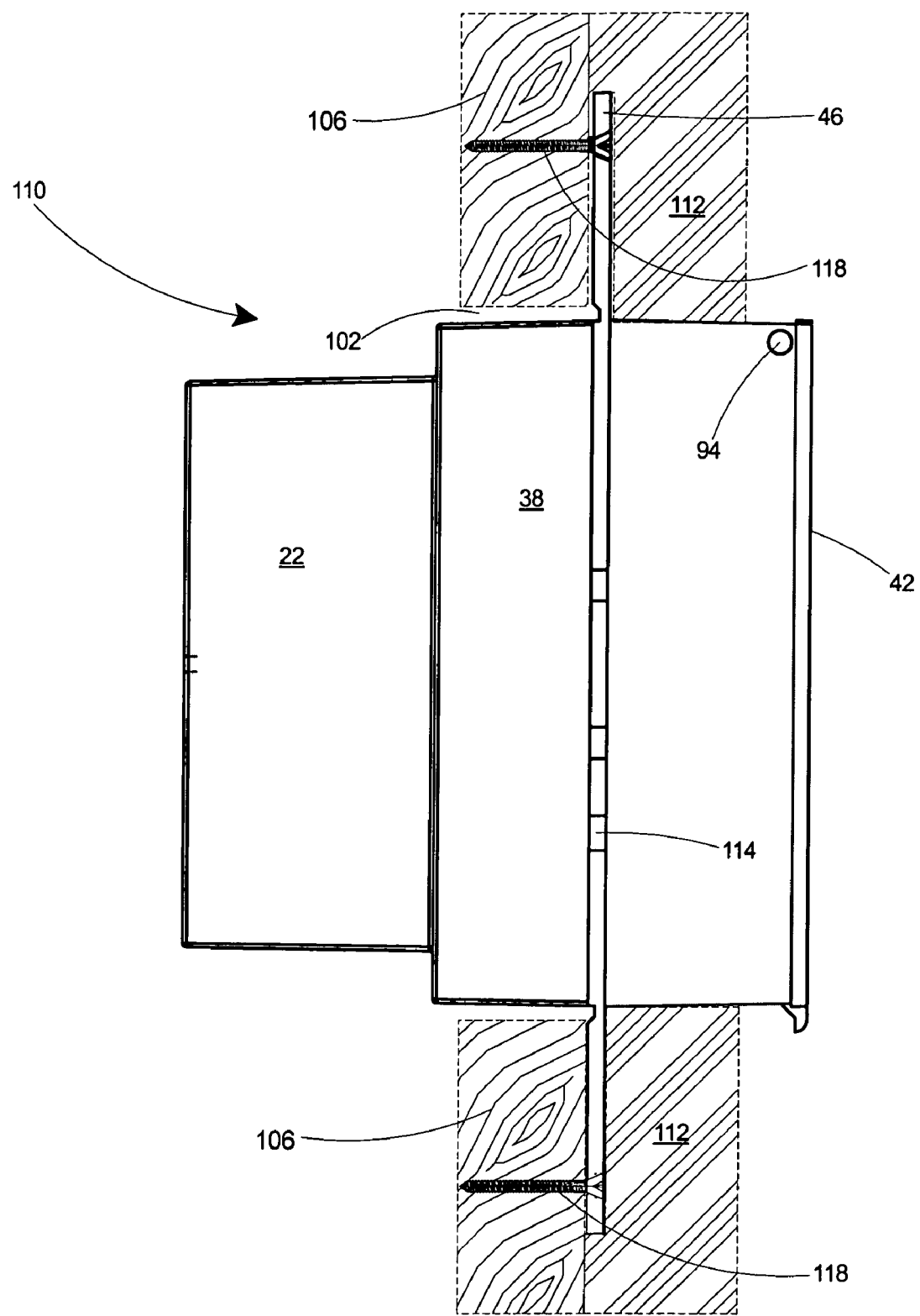
FIG. 9 is a side view of the recessed electrical box taken along line 9—9 of FIG. 8.
Figure 10:
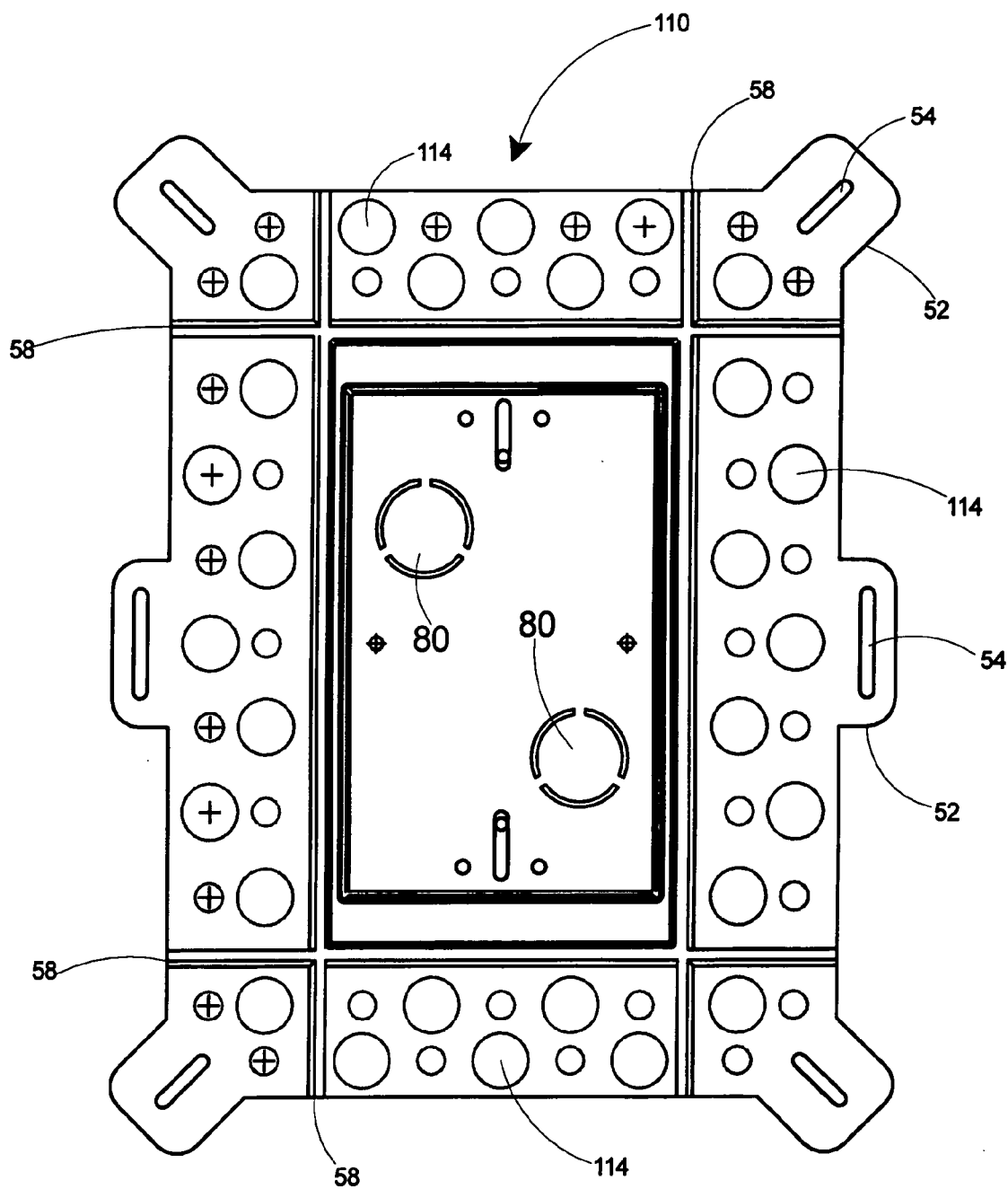
FIG. 10 is a back view of the electrical box of FIG. 8.
Figure 14:
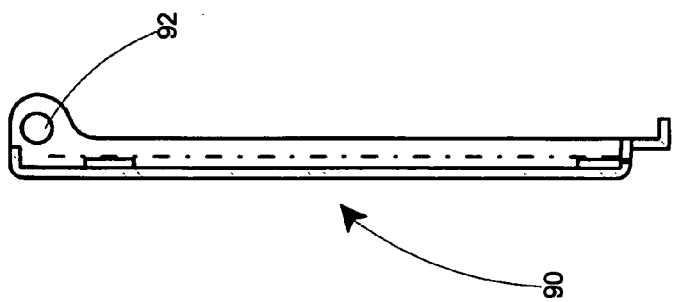
FIG. 14 is a bottom view of the cover member of FIG. 11.
Figure 12:
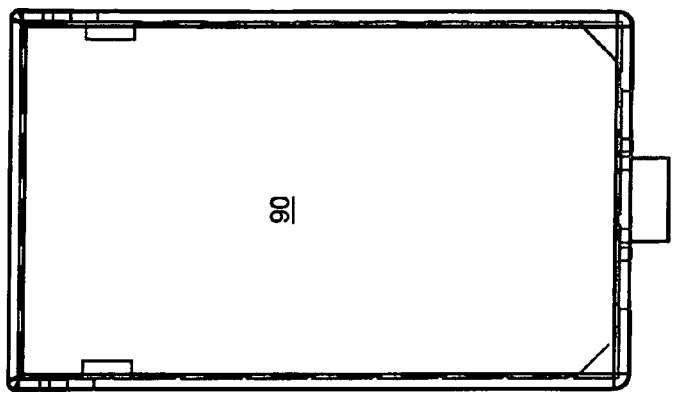
FIG. 12 is a front view of the cover member of FIG. 11.
Figure 13:
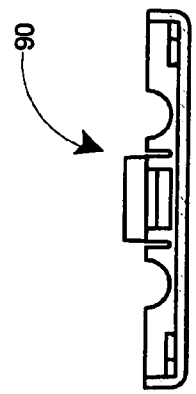
FIG. 13 is a side view of the cover member of FIG. 11.
Figure 11:
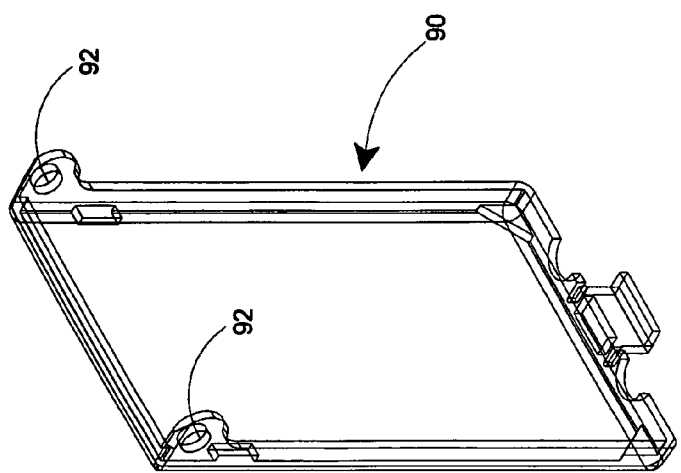
FIG. 11 is a perspective view of a cover member used with the electrical box of the present invention.

Referring to FIGS. 8–10, there is shown a third embodiment 110 of a recessed electrical box according to the present invention. The third embodiment of the recessed electrical box 110 is for use on a new building that is to be finished with a stucco layer 112. Electrical box 110 includes a removable inner flange 46 but no outer flange. As shown in FIG. 9, on an unfinished building, the box 110 is simply pushed into an appropriately sized hole 102 that has been cut in the substrate 106. There is no need for an outer flange, as a stucco layer will later be applied over the inner flange 46.

All of the embodiments of the recessed electrical box as presented herein are preferably integrally formed in one piece. Therefore the first box 22, the second box 38, and the flange or flanges, including the inner flange 46 and the outer flange 48, are integrally molded in one piece. The recessed electrical box is preferably formed by injection molding of plastic. The plastic is preferably polycarbonate, polyvinyl chloride, polyethylene, or polypropylene.

The recessed electrical box of the present invention simplifies the installation of electrical devices on all types of finished exteriors, including siding or stucco. It is adaptable to being installed on an unfinished wall or as a retrofit on an existing finished wall. Operation of the recessed electrical box is accomplished by first determining whether it will be used in new construction, in which the building substrate is installed but not the siding or other finish layer, or it will be used on an existing building.

Figure 2B:
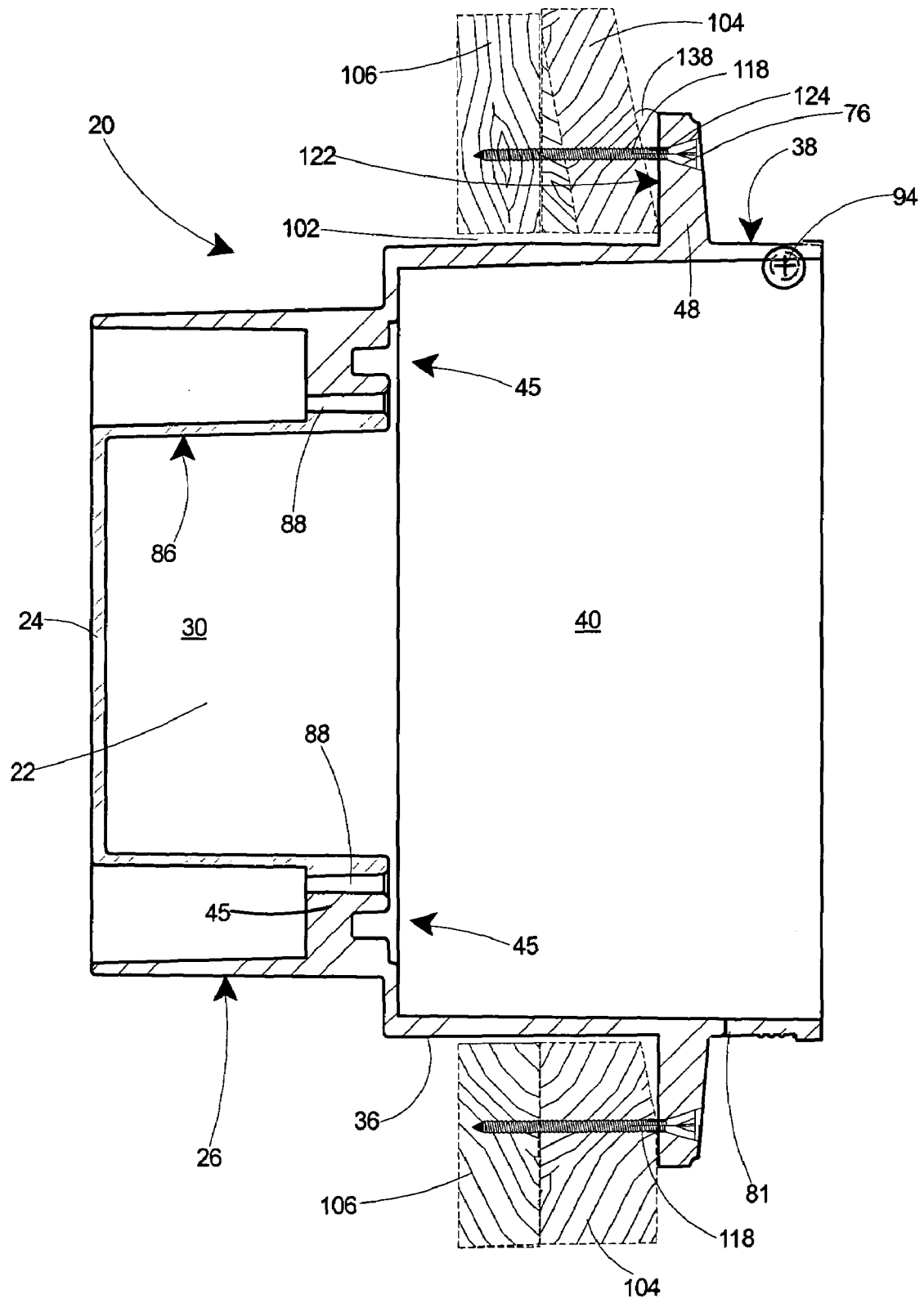
FIG. 2B is a sectional view of the recessed electrical box taken along line 2—2 of FIG. 1 and shown mounted to the siding of an existing building.

The reader is referred to FIG. 2A for an understanding of the installation procedure for the recessed electrical box on a newly constructed building and to FIG. 2B for an understanding of the installation procedure for the recessed electrical box on an existing building. If the building is under construction, with the substrate installed but no finished layer, the recessed electrical box is installed by first cutting an appropriately sized and shaped hole 102 in the substrate to accept the electrical box, as shown in FIG. 2A. The recessed electrical box 20 is then inserted into the hole 102 until the back surface 56 of the inner flange 46 is flush against the substrate 106. Fasteners 118 are then inserted through the slots 54 and tightened to secure the electrical box 20 to the substrate 106. The exterior of the building is then finished by installing siding 104 on the substrate 106. The ends of the siding are placed flush with the second peripheral sidewalls 36 in the gap 96.

With reference to FIG. 2B, if the building is an existing building, with both the siding and substrate installed, this is termed a "retrofit" of an electrical box to an existing building. In this situation, the recessed electrical box 20 is installed by first cutting an appropriately sized and shaped hole 102 in both the substrate 106 and the siding 104 to accept the electrical box 20. If the building is an existing building, the inner flange 46 is removed by cutting along the grooves 58 (see FIG. 4) that are adjacent the outer periphery 68 of the second box 38. With the inner flange 46 removed, the electrical box 20 is inserted into the hole 102 until the back surface 122 of the outer flange 48 is flush against the siding 104. Holes 120 are then drilled in the outer flange 48 and fasteners 118 inserted therethrough. The fasteners 118 are then tightened into the siding 104 and the substrate 106 to secure the recessed electrical box 20 to the siding and the substrate. Caulking 138 is then applied at the juncture of the electrical box 20 with the siding 104 to seal against rain and the elements.

Figure 6:
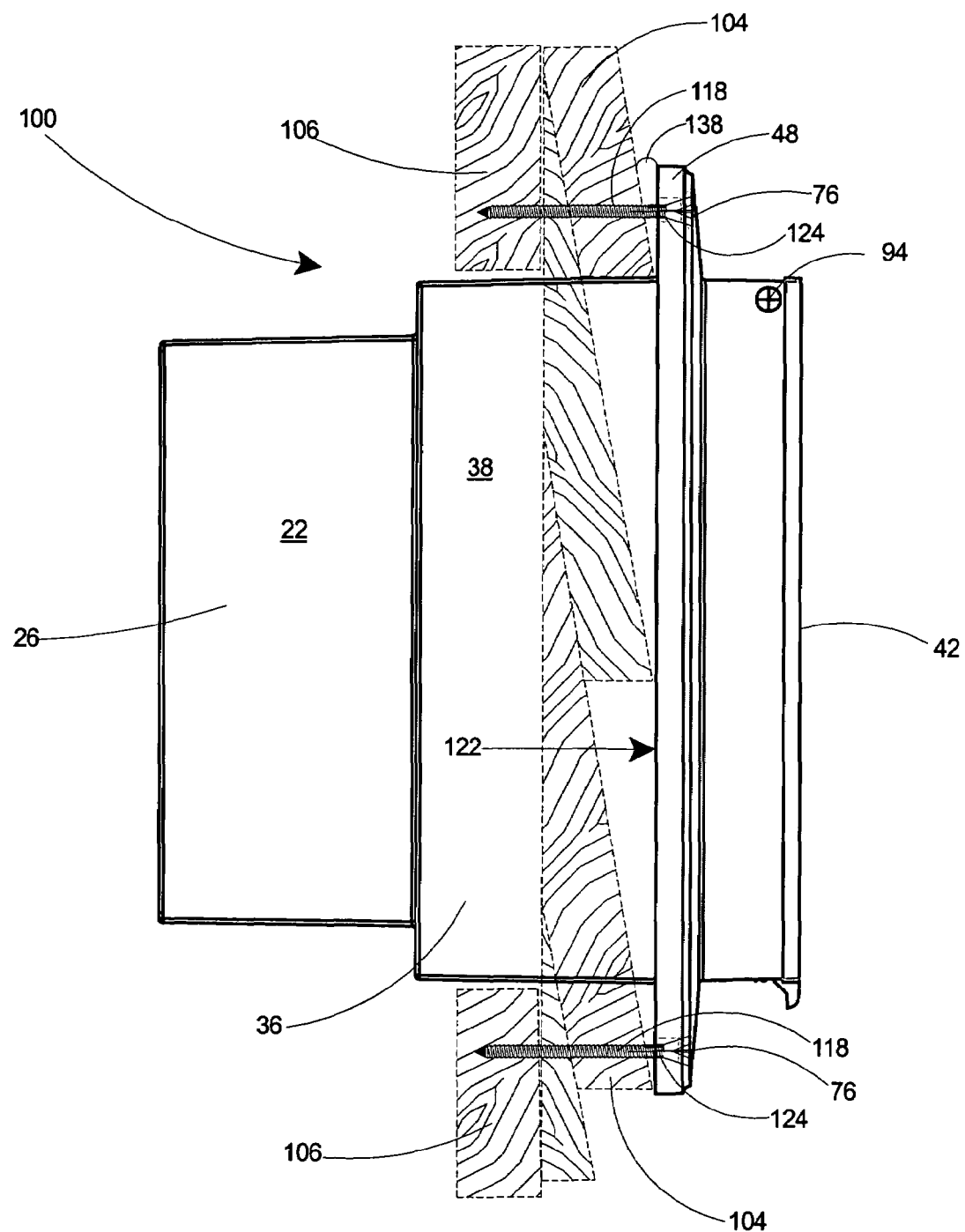
FIG. 6 is a side view of the recessed electrical box taken along line 6—6 of FIG. 5.
Figure 7:
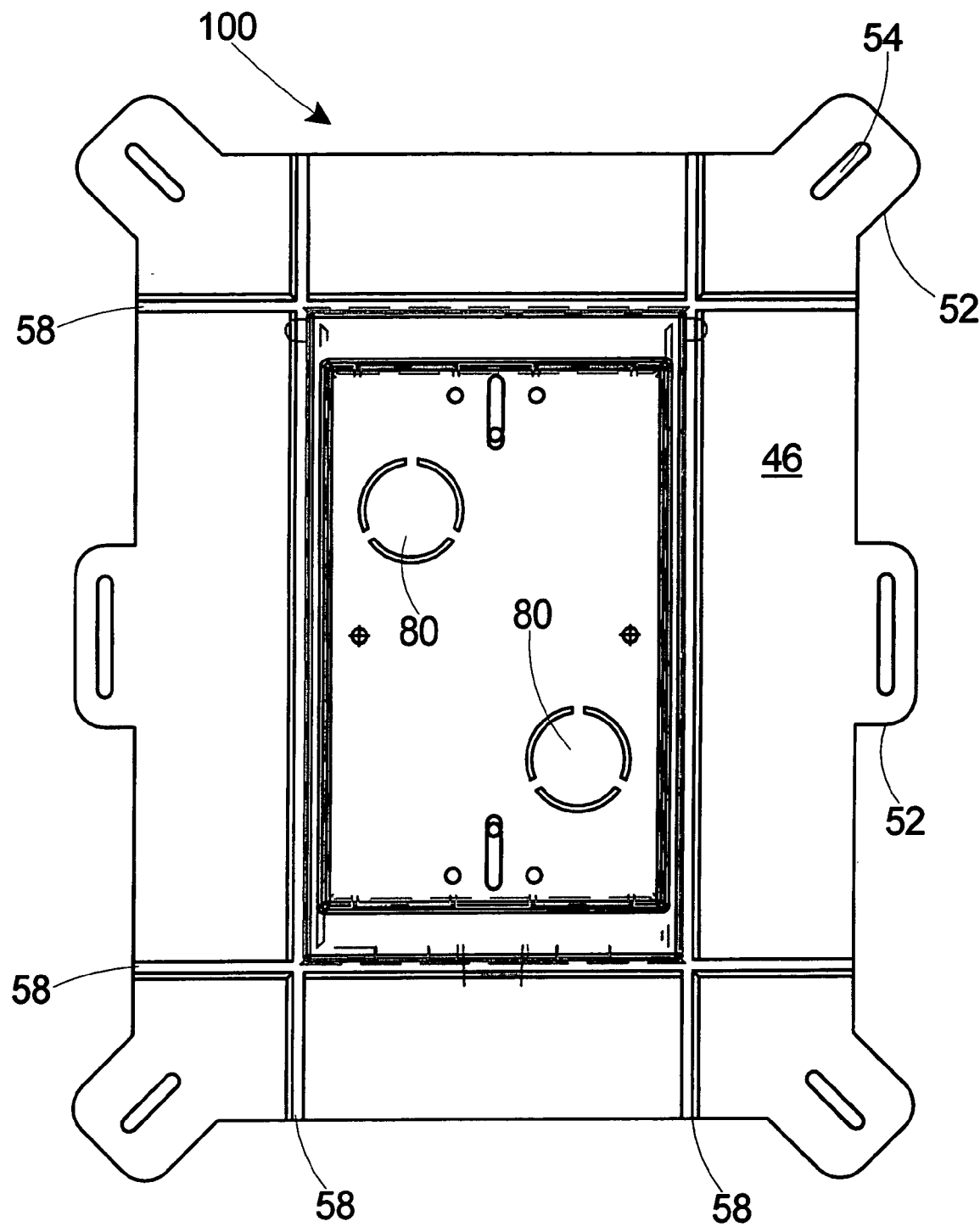
FIG. 7 is back view of the electrical box of FIG. 5.

The second embodiment of the recessed electrical box 100, shown in FIG. 6, simplifies installation of an electrical box on an existing building. As shown in FIG. 6, both the substrate 106 and the siding 104 are installed. As the second embodiment 100 includes an outer flange 48 but no inner flange, the installer is saved the extra effort of having to remove an unneeded flange. To operate the second embodiment of the recessed electrical box 100, the installer cuts an appropriately sized and shaped hole 102 in the siding 104 and substrate 106. The recessed electrical box 100 is then inserted into the hole 102 until the back surface 122 of the outer flange 48 is flush against the siding 104. In the second embodiment of the recessed electrical box 100, holes 124 are included in the outer flange 48. The fasteners 118 are then are then inserted through the holes 124 and tightened into the siding 104 and the substrate 106 to secure the recessed electrical box 100 to the siding and the substrate. Caulking 138 is then applied at the juncture of the electrical box 100 with the siding 104 to seal against rain and the elements.

As described above, the third embodiment of the recessed electrical box 110 is for use on a new building that will be finished with a stucco layer 112. With reference to FIG. 9, electrical box 110 includes a removable inner flange 46 but no outer flange. The third embodiment of the recessed electrical box can be used on the exterior wall of either a finished or unfinished building. To install the third embodiment 110 on an unfinished building, the box 110 is simply pushed into an appropriately sized hole 102 that has been cut in the substrate 106. Fasteners 118 are then placed through the slots 54 in the ears 52 of the inner flange 46 and tightened into the substrate 106. There is no need for an outer flange, as a stucco layer will later be applied over the inner flange 46 and no unsightly gap will exist between the stucco and the electrical box. The inner flange 46, as shown in FIG. 10, includes a plurality of holes 114 that allow stucco to flow through the inner flange 46 and thereby form a better adhesion to the inner flange 46 and to the substrate 106.

Figure 15:
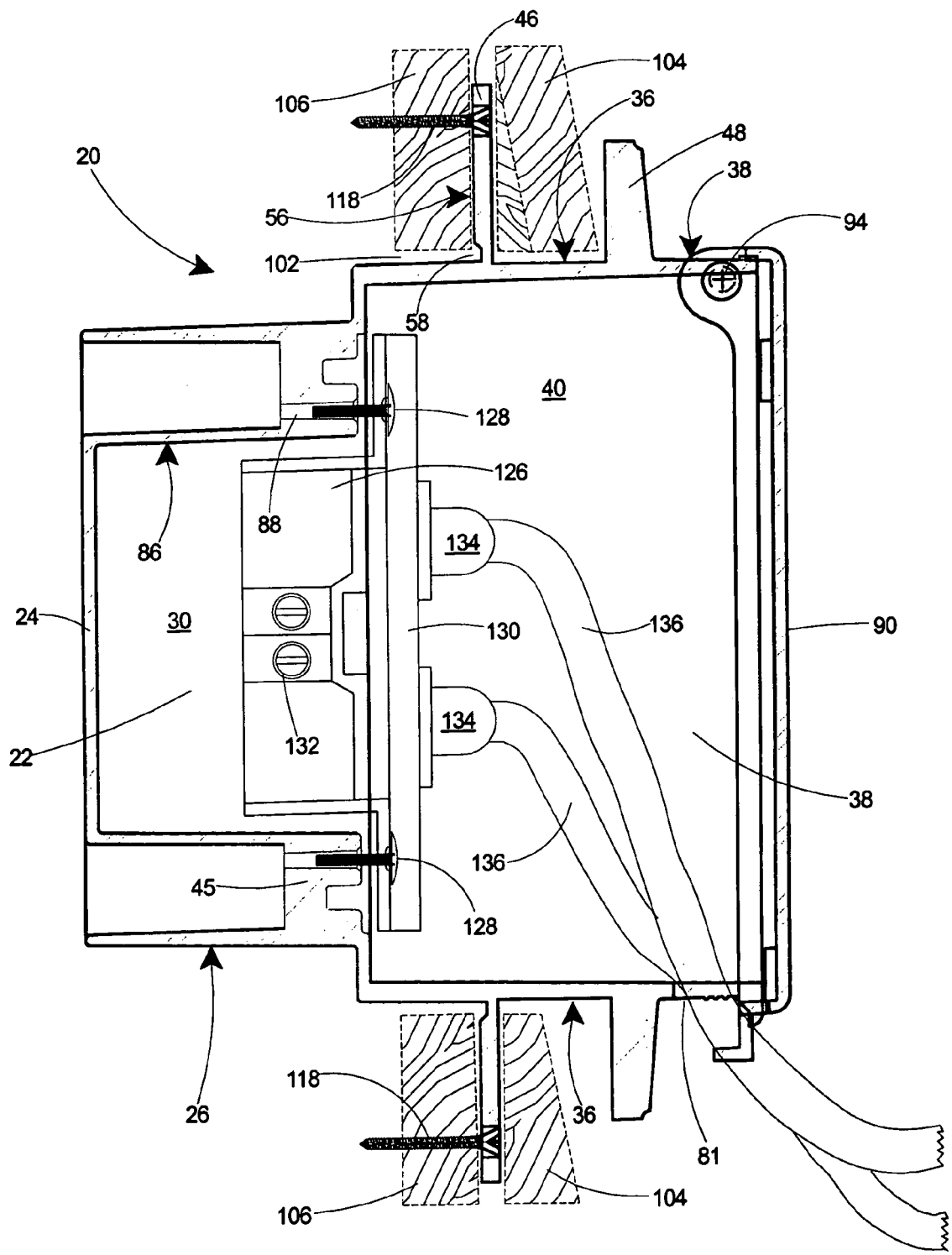
FIG. 15 is a sectional view of the recessed electrical box of FIG. 1 shown with a duplex receptacle installed therein and secured to an unfinished exterior wall.

FIG. 15 depicts installation of the preferred embodiment of the recessed electrical box 20 on an unfinished wall or substrate 106. For installation on the unfinished wall, a hole is made in the substrate 106 and the recessed box 20 is inserted until the inner flange contacts the substrate 106. To secure the electrical box 20 to the building, fasteners 118 are driven through the slots 54 provided in the inner flange 46 and into the substrate 106. The finish layer 104, consisting of lapped siding or any appropriate siding material, is installed within the gap 96 and placed snug against the second peripheral sidewalls 36. A duplex outlet 126 or other electrical device is then secured therein by device fasteners 128. A face plate 130 is fastened to the duplex outlet 126 to close the first box 22 and thereby seal the first enclosure 30 to protect the terminals 132 of the duplex outlet 126 and any wiring therein. The plug ends 134 of two electrical cords 136 are shown plugged into the duplex outlet 126 and run from the outlet 126 through the second enclosure 40 of the recessed electrical box 20 and through the cord slots 81 in the electrical box.

Figure 16:
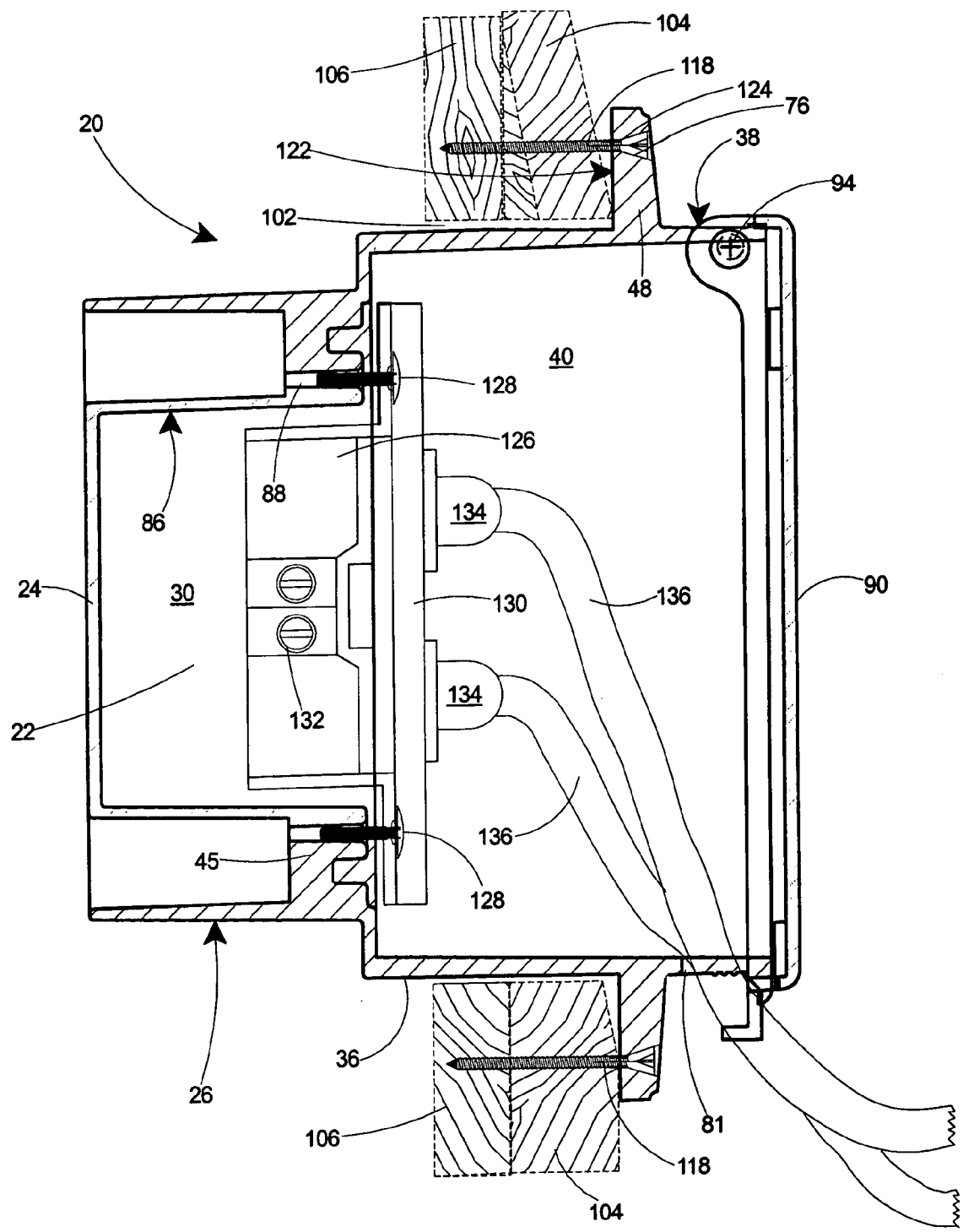
FIG. 16 is a sectional view of the recessed electrical box of FIG. 1 shown with a duplex receptacle installed therein and secured to a finished exterior wall.

FIG. 16 depicts installation of the preferred embodiment of the recessed electrical box 20 on a finished wall or siding 104. For installation on a finished wall 104, the inner flange is removed and a hole 102 cut in the siding 104 or other finish layer to a size large enough to accommodate the outer periphery of the second peripheral sidewalls 36. The outer periphery of the outer flange 48 can be provided with indentations 76 to define drill bit guides. The electrical box 20, with the inner flange removed, is fitted into the hole 102 and pushed therein until the outer flange 48 is flush with the outer surface of the siding 104. Holes are drilled in the outer flange 48 and fasteners 118 inserted therein to secure the recessed electrical box 20 to the siding 104 and substrate 106 and thereby to the building. Caulking 138 is then applied at the juncture of the electrical box 20 with the siding 104 to seal against rain and the elements.

Having thus described the invention with reference to a preferred embodiment, it is to be understood that the invention is not so limited by the description herein but is defined as follows by the appended claims.

What is claimed is:

1. An electrical box comprising:
a first box including a back wall, orthogonally extending peripheral sidewalls, and an open front defining a first enclosure therein;
said peripheral sidewalls having a front edge at said open front;
a transverse wall portion extending outwardly and orthogonally from said peripheral side walls at said front edge;
second peripheral sidewalls extending orthogonally from said transverse wall portion and forming a second box and a second enclosure therein;
at least one flange integral with and extending outwardly and orthogonally from said second peripheral sidewalls;
said second peripheral sidewalls terminating in a planar front edge of said second box;
said planar front edge of said second box having an opening therein to said second enclosure; and
a securement arrangement at said open front of said first enclosure for accepting an electrical device.

2. The electrical box of claim 1 wherein
said at least one flange includes an inner flange and an outer flange;
said inner flange extends transversely substantially beyond said outer flange;
said inner flange includes an outer edge and a plurality of ears extending beyond said outer edge; and
a slot in each of said ears wherein said slots are capable of accepting fastening devices therethrough.

3. The electrical box of claim 2 wherein
said inner flange includes a back surface;
said back surface of said inner flange includes grooves adjacent each of said second peripheral sidewalls of said second box; and
said grooves extend from one side of said outer edge to an opposing side of said outer edge,
whereby said grooves form reduced thickness flange portions to allow scoring therein to remove said inner flange adjacent said second peripheral sidewalls.

4. The electrical box of claim 3 wherein
said second box has an outer periphery; and
removal of said inner flange creates an outer surface substantially equal to said outer periphery.

5. The electrical box of claim 4 wherein said outer flange extends substantially beyond said second peripheral sidewalls of said second box.

6. The electrical box of claim 2 wherein said inner and outer flanges are in parallel planes.

7. The electrical box of claim 6 wherein said inner and outer flanges residing in parallel planes form a gap therebetween.

8. The electrical box of claim 2 wherein said outer flange includes one or more indentations therein whereby said indentations form guides for drilling of holes therein.

9. The electrical box of claim 1 wherein said first box, said second box, and said at least one flange are all integrally formed in one piece.

10. The electrical box of claim 9 wherein said first box, said second box, and said at least one flange are formed by injection molding of plastic.

11. The electrical box of claim 10 wherein said plastic is selected from the group including polycarbonate, polyvinyl chloride, polyethylene, or polypropylene.

12. The electrical box of claim 1 wherein said back wall and said peripheral sidewalls of said first box include one or more removable wall portions which may be removed for passage of wiring therein.

13. The electrical box of claim 1 wherein said securement arrangement includes
integral projections from said peripheral sidewalls of said first box extending transversely into said first enclosure; and
threaded bores in said integral projections.

14. The electrical box of claim 1 wherein said electrical box includes an inner flange extending outwardly and orthogonally from said second peripheral sidewalls of said second box.

15. The electrical box of claim 14 wherein
said inner flange of said second box extends transversely substantially beyond said second peripheral sidewalls;
said inner flange includes an outer edge and a plurality of ears extending beyond said outer edge;
each of said ears include slots therein, said slots capable of accepting fastening devices therethrough; and
said inner flange includes a plurality of holes therein, said holes allowing said inner flange to accept stucco therethrough to improve adhesion of said stucco to said inner flange.

16. The electrical box of claim 14 wherein
said inner flange extends transversely substantially beyond said second peripheral sidewalls of said second box; and
said inner flange includes a plurality of indentations therein, whereby said indentations form guides for drilling of holes therein.

17. The electrical box of claim 1 including a cover member pivotably attached to said second box at said planar front edge.

18. The electrical box of claim 6 wherein said second peripheral sidewalls of said second box include one or more cord slots extending therein from said planar front edge of said second box, said cord slots forming a passageway for electrical cords.

19. A method of installing an electrical box on a new building having a substrate thereon or on an existing building having a substrate and siding thereon, including:
a) providing an electrical box including a first box including a back wall, orthogonally extending peripheral sidewalls, an open front defining a first enclosure therein, a front edge at said open front, a transverse wall portion extending outwardly and orthogonally from said peripheral side walls at said front edge, second peripheral sidewalls extending orthogonally from said transverse wall portion and forming a second box and a second enclosure therein, two flanges extending outwardly and orthogonally from said second peripheral sidewalls of said second box, said flanges including an inner and an outer flange, said second peripheral sidewalls of said second box terminating in a planar front edge, said planar front edge having an opening therein to said second enclosure, a securement arrangement at said open front of said first enclosure for accepting an electrical device, a back surface on said inner flange, and grooves on said back surface of said inner flange adjacent each of said second peripheral sidewalls of said second box slots in said inner flange, a gap between said inner flange and said outer flange, said outer flange including a back and a front surface;
b) determining whether said building is a new or existing building;
  i. if the building is new:
    A) cutting a hole in said substrate;
    B) inserting said first box into said hole until said back surface of said inner flange is flush against said substrate;
    C) inserting fasteners through said slots;
    D) tightening said fasteners into said substrate to secure said second box to said substrate;
    E) installing wiring and said electrical device in said first enclosure;
    F) finishing said new building by installing siding on said substrate, said siding placed flush with said second peripheral sidewalls of said second box in said gap; and
    G) caulking at the juncture of said second box with said siding;
  ii. if the building is an existing building:
    A) cutting a hole in said siding and said substrate;
    B) removing said inner flange by cutting along said grooves;
    C) inserting said first box into said hole until said back surface of said outer flange is flush against said siding;
    D) drilling holes in said outer flange;
    E) inserting fasteners through said holes in said outer flange;
    F) tightening said fasteners into said siding and said substrate to secure said second box to said siding and said substrate;
    G) installing wiring and said electrical device in said first enclosure; and
    H) caulking at the juncture of said second box with said siding.

* * * * *